(12) United States Patent
Kamerbeek et al.

(10) Patent No.: US 10,597,224 B2
(45) Date of Patent: Mar. 24, 2020

(54) CAPSULE, SYSTEM AND METHOD FOR PREPARING A PREDETERMINED QUANTITY OF BEVERAGE SUITABLE FOR CONSUMPTION

(71) Applicant: Koninklijke Douwe Egberts B.V., Utrecht (NL)

(72) Inventors: Ralf Kamerbeek, Utrecht (NL); John Henri Flamand, Utrecht (NL); Angenita Dorothea van Loon-Post, Utrecht (NL); Hendrik Cornelis Koeling, Utrecht (NL); Arend Cornelis Jacobus Biesheuvel, Werkendam (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 183 days.

(21) Appl. No.: 15/922,766

(22) Filed: Mar. 15, 2018

(65) Prior Publication Data
US 2018/0305117 A1 Oct. 25, 2018

Related U.S. Application Data

(60) Division of application No. 15/069,629, filed on Mar. 14, 2016, now Pat. No. 9,944,456, which is a
(Continued)

(30) Foreign Application Priority Data

Jun. 17, 2009 (EP) ..................................... 09162895
Jun. 17, 2009 (EP) ..................................... 09162914
(Continued)

(51) Int. Cl.
*B65D 85/804* (2006.01)
*A47J 31/36* (2006.01)
(Continued)

(52) U.S. Cl.
CPC .......... *B65D 85/8043* (2013.01); *A23F 5/262* (2013.01); *A47J 31/368* (2013.01);
(Continued)

(58) Field of Classification Search
CPC .... B65D 85/8043; A23F 5/262; A47J 31/368; A47J 31/369; A47J 31/407
See application file for complete search history.

(56) References Cited

U.S. PATENT DOCUMENTS

| | | |
|---|---|---|
| 3,615,708 A | 10/1971 | Abile-Gal |
| 4,321,139 A | 3/1982 | Auclair |

(Continued)

FOREIGN PATENT DOCUMENTS

| | | |
|---|---|---|
| CN | 1681425 A | 10/2005 |
| EP | 1 203 554 | 5/2002 |

(Continued)

OTHER PUBLICATIONS

European Patent Office Communication for European Application No. 09 796 107.2-2313, dated Dec. 4, 2012, 5 pages.
(Continued)

*Primary Examiner* — Viren A Thakur
*Assistant Examiner* — Chaim A Smith
(74) *Attorney, Agent, or Firm* — Foley & Lardner LLP

(57) ABSTRACT

A capsule for preparing a predetermined quantity of beverage with a beverage brewing device is disclosed. The beverage brewing device comprises a receptacle for receiving the capsule. The capsule comprises a cup comprising a circumferential wall, a bottom closing the circumferential wall at a first end, and a lid in use connected to the cup at a second end of the circumferential wall opposite the bottom. The wall, bottom and lid, in use, enclose an inner space comprising the extractable product. At least a portion of a surface of the capsule conceived to, in use, interact with the
(Continued)

receptacle is provided with at least one projection for forming a sealing engagement with the receptacle.

22 Claims, 12 Drawing Sheets

Related U.S. Application Data continuation of application No. 13/323,408, filed on Dec. 12, 2011, now Pat. No. 9,307,857, which is a continuation of application No. PCT/NL2009/050814, filed on Dec. 30, 2009.

(30) Foreign Application Priority Data

| | | | |
|---|---|---|---|
| Jun. 17, 2009 | (EP) | ..................................... | 09162931 |
| Jun. 19, 2009 | (EP) | ..................................... | 09163310 |
| Aug. 13, 2009 | (EP) | ..................................... | 09167851 |
| Sep. 17, 2009 | (EP) | ..................................... | 09170590 |

(51) Int. Cl.
  *A47J 31/40* (2006.01)
  *A23F 5/26* (2006.01)
  *B65D 65/46* (2006.01)

(52) U.S. Cl.
  CPC ........... *A47J 31/369* (2013.01); *A47J 31/407* (2013.01); *B65D 65/466* (2013.01)

(56) References Cited

U.S. PATENT DOCUMENTS

| | | |
|---|---|---|
| 4,417,504 A | 11/1983 | Yamamoto |
| 4,775,048 A | 10/1988 | Baecchi et al. |
| 4,859,337 A | 8/1989 | Woltermann |
| 5,325,765 A | 7/1994 | Sylvan et al. |
| 5,840,189 A | 11/1998 | Sylvan et al. |
| D408,679 S | 4/1999 | Potts et al. |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| D489,215 S | 5/2004 | Honan et al. |
| D502,362 S | 3/2005 | Lazaris et al. |
| D513,572 S | 1/2006 | Schaffeld et al. |
| 7,165,488 B2 | 1/2007 | Bragg et al. |
| D544,299 S | 6/2007 | Schaffeld et al. |
| D554,299 S | 10/2007 | Ragonetti et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,513,192 B2 | 4/2009 | Sullivan et al. |
| 7,523,695 B2 | 4/2009 | Streeter et al. |
| 7,543,527 B2 | 6/2009 | Schmed |
| 7,552,672 B2 | 6/2009 | Schmed |
| 7,640,845 B2 | 1/2010 | Woodnorth et al. |
| 7,856,920 B2 | 12/2010 | Schmed et al. |
| 2004/0045443 A1 | 3/2004 | Lazaris et al. |
| 2005/0051478 A1 | 3/2005 | Karanikos et al. |
| 2005/0205601 A1 | 9/2005 | Taylor |
| 2005/0287251 A1 | 12/2005 | Lazaris et al. |
| 2006/0107841 A1 | 5/2006 | Schifferle |
| 2006/0174773 A1 | 8/2006 | Taylor |
| 2006/0292012 A1 | 12/2006 | Brudevold et al. |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2010/0024658 A1 | 2/2010 | Jacobs et al. |
| 2010/0303964 A1 | 12/2010 | Beaulieu et al. |

FOREIGN PATENT DOCUMENTS

| | | |
|---|---|---|
| EP | 1 654 966 A1 | 5/2006 |
| EP | 1 849 715 B1 | 10/2007 |
| EP | 1 900 653 B1 | 3/2008 |
| EP | 1 944 248 A1 | 7/2008 |
| EP | 1 961 676 | 8/2008 |
| EP | 2 070 828 B1 | 6/2009 |
| FR | 2041380 A5 | 1/1971 |
| FR | 2617389 A1 | 1/1989 |
| JP | 06-507568 | 9/1994 |
| JP | 07-034258 U | 6/1995 |
| JP | 11-121245 | 4/1999 |
| JP | 2008-517838 A | 5/2008 |
| WO | WO-93/17932 | 9/1993 |
| WO | WO-2006/137737 | 12/2006 |
| WO | WO-2007/126978 A2 | 11/2007 |
| WO | WO-2007/137974 A2 | 12/2007 |
| WO | WO-2008/078988 A1 | 7/2008 |
| WO | WO-2010/084475 A2 | 7/2010 |
| WO | WO-2010/137946 | 12/2010 |

OTHER PUBLICATIONS

Examination Search Report, Canadian App. No. 2,764,942, Sara Lee / DE B.V., 1 page (dated Nov. 3, 2015).

Search Report for Singapore Application No. 10201502891S, dated Dec. 30, 2015, 14 pages.

CAPSULE, SYSTEM AND METHOD FOR PREPARING A PREDETERMINED QUANTITY OF BEVERAGE SUITABLE FOR CONSUMPTION

CROSS-REFERENCE TO RELATED PATENT APPLICATIONS

The present application is a divisional of U.S. patent application Ser. No. 15/069,629, filed Mar. 14, 2016; which is a continuation of U.S. patent application Ser. No. 13/323,408, filed on Dec. 12, 2011; which is a continuation of International Patent Application No. PCT/NL2009/050814, filed on Dec. 30, 2009; which claims priority to European Patent Application No. 09162895.8, filed Jun. 17, 2009; European Patent Application No. 09162914.7, filed Jun. 17, 2009; European Patent Application No. 09162931.1, filed Jun. 17, 2009; European Patent Application No. 09163310.7, filed Jun. 19, 2009; European Patent Application No. 09167851.6, filed Aug. 13, 2009; and European Patent Application No. 09170590.5, filed Sep. 17, 2009; all of which are incorporated herein by reference in their entirety.

BACKGROUND

The invention relates to a capsule, a system and a method for preparing a predetermined quantity of beverage suitable for consumption using an extractable product.

Systems for preparing a beverage, such as coffee, using a brewing device for supplying a liquid, such as water, under pressure to a capsule comprising a dose of a beverage ingredient are known. Commonly, the brewing device comprises a receptacle for receiving the capsule, such as an enclosing member for enclosing the capsule. In use a sealing engagement is provided between the capsule and the enclosing member, so as to prevent leaking of a liquid, e.g. water or the beverage. The sealing engagement is usually obtained by pressing the capsule and the enclosing member against each other along a circumferential line of contact.

It is possible that the material of the enclosing member at the location of the sealing engagement, e.g. an elastomeric material, is softer than the material of the capsule at the location of the sealing engagement, e.g. aluminum. Such system is for instance known from EP 1 203 554. In such case the material of the enclosing member at the location of the sealing engagement may be compressed. Such systems may have the disadvantage that the material of the enclosing member at the location of the sealing engagement can subject to wear, degradation and/or fouling, so that the quality of the sealing engagement may deteriorate if the age of the brewing device increases.

This disadvantage seems to be, at least partially, overcome by other known systems, wherein the material of the enclosing member at the location of the sealing engagement, e.g. a metal, is harder than the material of the capsule at the location of the sealing engagement, e.g. a plastics material. Such system is for instance known from FR 2 617 389. In such case the material of the capsule at the location of the sealing engagement may be compressed. Such systems have the advantage that the material of the enclosing member at the location of the sealing engagement may be less subject to wear, degradation and/or fouling, while good sealing engagement may be obtained. Especially when the material of the capsule at the location of the sealing engagement is the same material as the material of the circumferential wall, the capsule may be manufactured with great ease. This may, however, provide the disadvantage that such sealing engagement may be upset if the enclosing member, at the location of the sealing engagement, possesses irregularities, such as scratches, crevices, caked-on foul, protrusions or the like.

SUMMARY

It is an object of the invention to at least partially meet at least one of the above disadvantages. In particular, it is an object of the invention to provide a capsule for preparing a predetermined quantity of beverage suitable for consumption using an extractable product conceived to be used in a beverage brewing device comprising a receptacle for interacting with the capsule, wherein there is has improved engagement between the capsule and the receptacle for mitigating possible leakages due to surface irregularities of the receptacle and/or the capsule.

Thereto, according to the invention a capsule is provided for preparing a predetermined quantity of beverage suitable for consumption using an extractable product, by means of a beverage brewing device comprising a receptacle for receiving the capsule, comprising a cup comprising a circumferential wall, a bottom closing the circumferential wall at a first end, and a lid in use connected to the cup at a second end of the circumferential wall opposite the bottom, wherein the wall, bottom and lid, in use, enclose an inner space comprising the extractable product, and wherein at least a portion of a surface of the capsule conceived to, in use, interact with the receptacle is provided with at least one projection for forming a sealing engagement with the receptacle, wherein the capsule comprises a further ridge which is substantially concentrically enveloping the at least one projection, wherein a height of the further ridge is different from the height of the at least one projection.

It is found that by providing local projections on a surface of the capsule in the area conceived to interact with the surface of the receptacle, surface irregularities of the latter may be efficiently mitigated. It will be appreciated that different type of surface irregularities may be envisaged, including, but not limited to, local recesses, local protrusions, cracks, bursts, local wear and so forth. Accordingly, the at least one projection may be provided on the surface of the capsule at a position wherein such irregularities have occurred or are likely to occur. The at least one projection may for instance be provided on the outer surface of the cup. In case the cup comprises a flange-like rim extending outwardly of the circumferential wall at the second end, the at least one projection may for instance be provided on the flange-like rim. The receptacle may be provided in the form of an enclosing member, which may be arranged to at least partially enclose the capsule, and may, in use, be pressed against the rim of the capsule. Due to the fact that the receptacle is usually manufactured from extruded plastic, minor manufacturing defects may occur. This may lead to further local irregularities of the outer surface of the receptacle conceived to engage with the flange-like rim of the capsule in use. Such further local irregularities may relate to recesses, i.e. local deepening of the outer surface of the receptacle or protrusions, i.e. local elevations of the outer surface of the receptacle.

By providing the flange-like rim of the capsule with at least one projection conceived to interact with a surface of the receptacle in use, thereby forming a sealing engagement with the receptacle, the named irregularities may be mitigated.

It will be appreciated that different types of a sealing engagement may be envisaged. For example, the at least one projection may be provided at an area of the capsule for achieving an abutment between the at least one projection and the surface of the receptacle conceived to interact with the capsule in use. It will be appreciated that those skilled in the art knowing a shape and a dimension of the outer surface of the receptacle conceived to come into contact with the capsule may readily appreciate at which region of the capsule the at least one projection is to be provided for forming said abutment.

In an embodiment, the height of the further ridge may be larger than the height of the at least one projection.

The further ridge may be arranged on a flange-like rim of the cup, on the side facing away from the lid. Here, the further ridge may be integral with the flange-like rim. The further ridge may be substantially concentric with the at least one projection. The further ridge may be arranged to abut against an outer circumferential surface of the receptacle of the brewing device which receptacle may be embodied as an enclosing. The outer circumferential surface of the enclosing member may be wedged against the inner circumferential surface of the further ridge.

In an embodiment, the further ridge may comprise a conical section on an inner circumferential surface thereof. Such a conical section on the inner circumferential surface of the further ridge facilitates insertion of the enclosing member within the perimeter of the further ridge. Thus, the at least one projection abuts against the enclosing member, and additionally, the further ridge abuts against the enclosing member. Hence, an improved sealing engagement between the capsule and the enclosing member may be obtained.

In an embodiment of the capsule according to the invention the at least one projection is circumferential with respect to the flange-like rim. However, it will be appreciated that the thus formed circumferential projection may not necessarily be circular. An irregularly shaped circumferential projection adapted to cooperate with a surface of the receptacle is envisaged as well. Such irregularly shaped circumferential projection may still have a rotational symmetry. This embodiment will be discussed in more details with reference to Figures.

It is found that although the at least one projection may be provided on selective areas of the flange-like rim which are likely to have irregular surface, for example, on separate regions along a periphery of the flange-like rim, it is advantageous to provide the at least one projection as a circumferential structure so that a rotational symmetry is preserved for positioning the capsule in the receptacle of the beverage brewing device.

In a still further embodiment of the capsule according to the invention the at least one projection comprises a body capable of retaining fluid.

It is found to be particularly advantageous to select for the at least one projection conceived to form a sealing engagement with the receptacle a material, which is capable of retaining fluid. Due to this feature possible microscopic imperfections of the sealing engagement are effectively mitigated due to fluid absorption in the material of the projection. Preferably, for such material a sponge-like material is used.

In a still further embodiment of the capsule according to the invention a plurality of elongated individual projections is provided, said projections forming a brush-like area.

It is found that a reliable sealing engagement can be achieved when a multi-body projection is envisaged, for example when a brush-like structure is provided on the flange-like rim of the capsule. This may have a reason that the elongated individual projections may be bent or be otherwise deformed by the receptacle without substantially influencing a spatial position of a neighbouring elongated projection. As a result, for example, when a surface of the receptacle conceived to come into contact with the capsule in use comprises a recess, such recess may be filled or be otherwise mitigated by one or a few elongated projections, for example, hairs, the neighbouring elongated projections being substantially not affected.

In a still further embodiment of the capsule according to the invention the elongated individual projections have different height.

It is found that local height differences of the surface of the receptacle may be effectively smoothed out when the individual elongated bodies of the brush-like structure have different height. Preferably, a basis height is selected for forming a sealing engagement when no surface irregularities of the receptacle are present. Some elongated bodies will have a greater height for mitigating local surface irregularities due to recesses. Preferably, height of the elongated individual projections is in the range of 0.1-2 mm, preferably in the range of 0.13-1 mm, more preferably in the range of 0.15-0.5 mm. It is found that good results have been achieved when the height of the elongated individual projections is about 0.25 mm. Preferably such brush-like structure is provided on the flange-like rim of the capsule for mitigating substantial surface irregularities, like cracks, surface indentation, for example due to wear and so forth.

It will be further appreciated that the elongated bodies may be provided on a base structure, or, alternatively, the elongated bodies may be formed as a set of grooves formed on an elevated base. Also in this case a height of the elongated structures, measured at their tops, is in the range of 0.1-2 mm, preferably in the range of 0.13-1 mm, more preferably in the range of 0.15-0.5 mm. It will be appreciated that such height may be measured with respect to a base surface of the flange-like rim of the capsule. This embodiment will be discussed in more detail with reference to Figures.

It will be further appreciated that such elongated structures may be formed from a material capable of deforming. In an extreme situation an elongated structure may be capable of being substantially fully flattened. The elongated structures may have a triangular, a circular or any other suitable cross-section.

In an alternative embodiment, the projection arranged on the flange-like rim may be substantially flat having a height in the range of 0.8-1.0 mm, whereas the projection is preferably formed from a soft material capable of deforming. Those skilled in the art will readily appreciate which class of materials, preferably plastics may be used for implementing such projection.

In a still further embodiment of the capsule according to the invention the at least one projection comprises a textured material.

This technical measure is based on the insight that minor surface irregularities may be mitigated by providing the at least one projection having a modulated surface, like texture. The modulated surface may comprise a mixture of regularly spaced depressions and elevated areas. Preferably, a height difference between the elevated areas and the depressed areas being at least 0.05 mm, preferably at least 0.15 mm. It is found that such embodiment is effective for providing adequate sealing engagement between the flange-like rim and the surface of the receptacle when the latter comprises recesses and/or protrusions.

In a still further embodiment of the capsule according to the invention the at least one projection comprises a plurality of interconnected tubular structures.

It is found that such embodiment advantageously combines features of a material capable of retaining fluid and a material capable of individual deformation, like a brush. Preferably, the plurality of interconnected tubular structures comprises polygonal structures, such as honeycomb structures. When interacting with the surface of the receptacle having either a protrusion or a depression, the array of tubular structures may deform locally substantially matching geometry of the local irregularity (depression or protrusion). Preferably, a height of the tubular structure is selected so that the array of the tubular structures is at least slightly compressed when being in contact with the surface of the receptacle for forming a sealing engagement.

In a still further embodiment of the capsule according to the invention the at least one projection comprises an oblique bridge extending between the flange-like rim and the wall.

This technical measure is based on the insight that leakages may occur in the area where a vertical capsule wall contacts the substantially horizontal and flat flange-like rim. In order to provide a sealing engagement with the receptacle in use, the flange-like rim is provided with an oblique structure which can act as a fitting between the receptacle and otherwise substantially rectangular geometry of the wall/rim interface.

It will be appreciated that the bridge structure may be provided along the whole circumference of the rim adjacent the wall, or, alternatively a suitable number of isolated bridge elements may be provided.

In a still further embodiment of the capsule the bridge comprises two or more branches deviating from a base portion attached to the flange-like rim.

It is found that by providing two deviating branches it is possible to achieve a further flexibility in accommodating local surface irregularities of the receptacle.

In a still further embodiment of the capsule the at least one projection is flexible. Preferably, at least one projection is elastically deformable.

In a still further embodiment of the capsule the at least one projection comprises a circumferential ridge. It has been found that such circumferential ridge may e.g. be subject to local deformation in order to adapt to any irregularities in the surface of the receptacle. Preferably, the at least one projection comprises a plurality of circumferential ridges.

For example, the capsule may be provided with a cup comprising a circumferential wall, a bottom closing the circumferential wall at a first end, and a flange-like rim extending outwardly of the circumferential wall at a second end opposite the bottom, and a lid in use connected to the flange-like rim, wherein the wall, bottom and lid, in use, enclose an inner space comprising the extractable product, and wherein the cup further comprises a plurality of substantially concentric circumferential ridges extending outwardly of the cup, wherein the ridges are made of the same material as the cup.

In use, at least one of the circumferential ridges may abut against at least a portion of the enclosing member, such that the sealing engagement is formed between, e.g. the top of, at least one of the ridges and the at least one portion of the receptacle, such as the enclosing member. Since the plurality of ridges is provided, a misalignment between the capsule and the enclosing member may be allowed while still obtaining the sealing engagement.

It is possible that in general the at least one projection is made of the same material as the cup. Hence, a relatively cheap at least one projection may be provided.

Preferably, the at least one projection, e.g. the ridge or ridges, is arranged on the flange-like rim, e.g. on the side of the flange-like rim facing away from the lid. Hence, the at least one projection, e.g. the ridge or ridges, may abut against a leading edge of the enclosing member. Thus, the sealing engagement may be formed at the location of the flange-like rim.

It is possible that the at least one projection, e.g. the ridge or ridges, is integral with the flange-like rim. Thus manufacture of the cup may include manufacture of the at least one projection, e.g. the ridge or ridges, e.g. by injection moulding the ensemble of the cup and the at least one projection, e.g. the ridge or ridges. Hence, easy manufacture of the cup of the capsule may be obtained.

In one embodiment, each ridge of the plurality of ridges has substantially the same height prior to use. Hence, each of the ridges of the plurality of ridges may contribute to the sealing engagement between the capsule and the enclosing member. Optionally, each ridge of the plurality of ridges has substantially the same width.

It is possible that a width of a ridge, of the plurality of ridges is smaller than a height of that ridge. Preferably this applies to each ridge of the plurality of ridges. Hence the ridge has a slender form, allowing easy deformation of the ridge, e.g. by compression of a top edge of the ridge towards a base of the ridge. Hence, the ridge may easily follow an irregularity of the enclosing member at the location of the sealing engagement, e.g. a dent and/or a protrusion at the leading edge of the enclosing member.

Preferably, a ridge of the plurality of the ridges has a width that is equal to or less than a thickness of the flange-like rim. Preferably, a ridge of the plurality of ridges has a height that is equal to or less than a thickness of the flange-like rim. Preferably this applies to each ridge of the plurality of ridges. Hence, a resistance of the ridge against compression may be less than a resistance against compression of the rim. Thus, the rim may be rigid relative to the ridge, while the ridge may possess enough compressibility due to its shape and/or dimensions to provide the sealing engagement with the enclosing member even if the enclosing member comprises an irregularity at the location of the sealing engagement.

It is possible that a ridge of the plurality of ridges has a height of more than 0.3 mm, preferably more than 0.21 mm, more preferably more than 0.15 mm. It is also possible that a ridge of the plurality of ridges has a maximum width of more than 0.3 mm, preferably more than 0.21 mm, more preferably more than 0.15 mm. Preferably, this applies to each ridge of the plurality of ridges. These dimensions have been found to provide good sealing engagement between the ridge and the enclosing member.

In an embodiment, a ridge of the plurality of ridges has a tapered, e.g. a substantially triangular, cross section. Preferably this applies to each ridge of the plurality of ridges. This provides the advantage that compression of the ridge requires a progressively increasing force. Hence, the ridge can easily follow the contour of an irregularity of the enclosing member since this will exert a locally increased force on the ridge.

Preferably all ridges of the plurality of ridges have the same cross sectional shape.

In an embodiment, a radial distance between two neighbouring ridges is less than a maximum width of the ridges, preferably less than 50% of the maximum width, more preferably less than 25% of the maximum width. Thus, the ridges are spaced closely together, allowing a good chance that at least one of the ridges properly abuts against the enclosing member, while still allowing ample space for the ridges to widen due to compression. Also, the closely spaced ridges allow for increased tolerance to misalignment of the capsule with respect to the enclosing member, since the narrow space between the ridges may form a labyrinth providing sufficient resistance against fluid flow to provide a sufficient sealing engagement between the capsule and the enclosing member, even if not one single ridge fully abuts against the enclosing member.

Preferably, the lid is connected to the flange-like rim and the inner space is at least partially filled with the extractable product. Hence, the capsule ready for use is provided. The capsule may be hermetically closed, e.g. so as to improve shelf life of the capsule. Alternatively, the lid and/or bottom is porous and/or comprises openings for allowing a liquid to enter and/or exit the inner space.

In an embodiment, the capsule is disposable. The disposable capsule is designed and intended to be disposed after single use. Thus, problems associated with hygiene, e.g. microbial growth, may be minimised.

Preferably, the capsule is designed for preparing a single serving of the beverage.

The invention also relates to a system for preparing a predetermined quantity of beverage suitable for consumption using an extractable product, comprising i) a capsule according to the invention; and ii) a beverage brewing device comprising a receptacle for interacting with the capsule, e.g. an enclosing member for enclosing the capsule, wherein, in use, the at least one projection, e.g. at least one of the ridges, abuts against at least a portion of the receptacle, e.g. enclosing member, such that a sealing engagement between the capsule and the receptacle, e.g. enclosing member, is formed.

In an embodiment at least a portion of a leading edge of the enclosing member is arranged to abut against at least one of the ridges. Herein the ridges may be arranged on the flange-like rim of the capsule.

Preferably, the ridges each have an individual width that is less than the width of the leading edge of the enclosing member. This provides the advantage that the ridges are narrow relative to the leading edge of the enclosing member. Thus, the ridges may easily adapt to a, e.g. small, irregularity, such as a dent, scratch, crevice and/or protrusion, on the leading edge of the enclosing member.

Preferably, the plurality of ridges has a combined width that is larger than the width of the leading edge of the enclosing member. Hence, considerable tolerance for misalignment of the capsule with respect to the leading edge of the enclosing member is provided.

It is possible that a ridge of the plurality of ridges has a height that is less than the width of the leading edge of the enclosing member. Preferably this applies to each ridge of the plurality of ridges. Thus, the ridge has a small height relative to the width of the leading edge of the enclosing member. This may prevent buckling of the ridges so that good sealing engagement between the leading edge of the enclosing member and the ridges may be obtained.

The invention also relates to a method for preparing a predetermined quantity of beverage suitable for consumption using a system according to the invention.

These and other aspects of the invention will be discussed in more detail with reference to drawings, wherein like reference numerals refer to like elements. It will be appreciated that the drawings are presents for illustrative purposes and may not be used for limiting the scope of the appended claims.

BRIEF DESCRIPTION OF THE DRAWINGS

The invention will now be further elucidated by means of, non-limiting, examples referring to the drawing, in which.

DETAILED DESCRIPTION OF EXEMPLARY EMBODIMENTS

Figure 1:
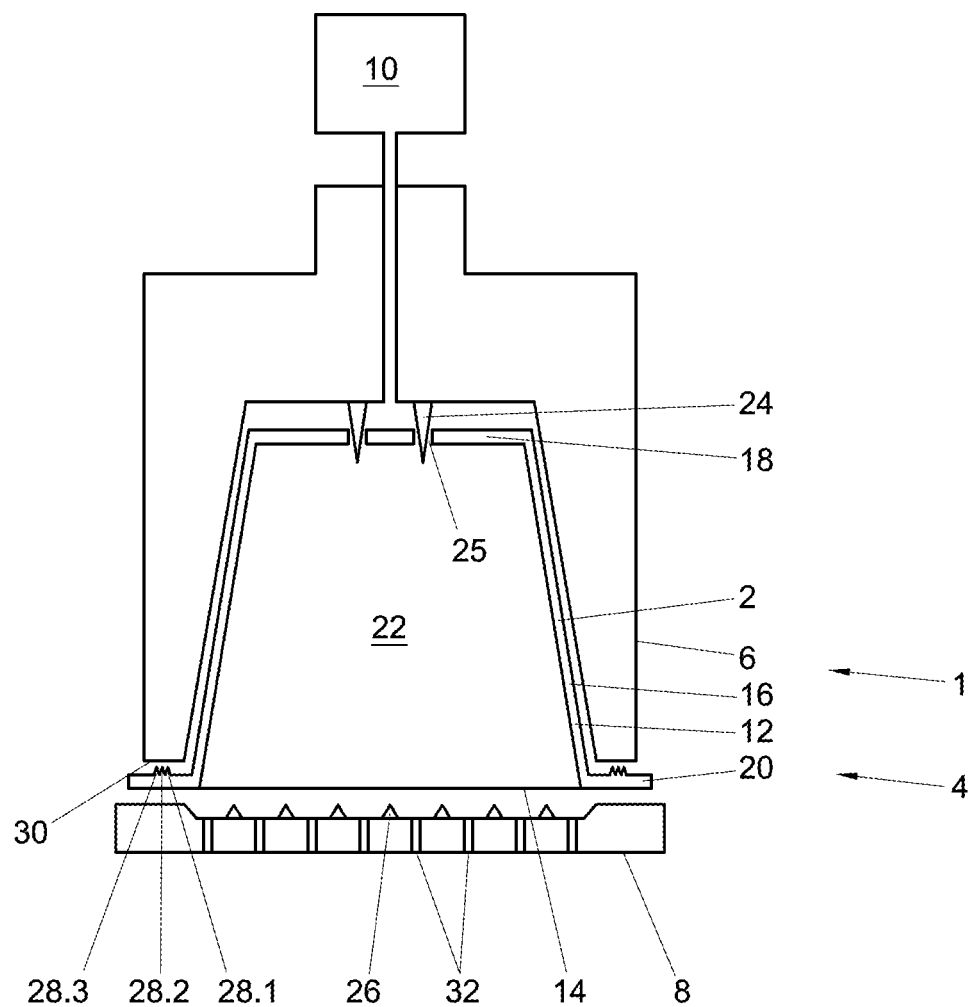
FIG. 1 shows a schematic representation of a first example of a system according to the invention.

FIG. 1 shows a schematic representation, in cross sectional view, of a first example of a system 1 for preparing a predetermined quantity of beverage suitable for consumption using an extractable product. The system 1 comprises an exchangeable capsule 2, and a beverage brewing device 4. The device 4 comprises a receptacle in the form of an enclosing member 6 for holding the exchangeable capsule 2. In this example, the device 4 further comprises a support member 8 for supporting the capsule 2.

In FIG. 1 a gap is drawn between the capsule 2, the enclosing member 6 and the support member 8 for clarity. It will be appreciated that, in use, the capsule 2 may lie in contact with the enclosing member 6 and the support member 8. Commonly, the enclosing member 6 has a shape complementary to the shape of the capsule 2. The apparatus 4 further comprises a fluid dispensing device 10 for supplying an amount of a fluid, such as water, under a pressure, of e.g. 9 bars, to the exchangeable capsule 2.

In the example shown in FIG. 1, the exchangeable capsule 2 comprises a cup 12 and a lid 14. In this example, the cup 12 comprises a circumferential wall 16, a bottom 18 closing the circumferential wall 16 at a first end, and a flange-like rim 20 extending outwardly of the circumferential wall 16 at a second end opposite the bottom 18 wall. The circumferential wall 16, the bottom 18 and the lid 14 enclose an inner space 22 comprising the extractable product. In this example, the capsule is initially sealed, i.e. is hermetically closed prior to use.

The system 1 of FIG. 1 comprises bottom piercing means 24 for piercing the bottom 18 of the capsule 2 for creating at least one entrance opening 25 in the bottom 18 for supplying the fluid to the extractable product through the entrance opening 25.

The system 1 of FIG. 1 further comprises lid piercing means 26, here embodied as protrusions of the support member 8, for piercing the lid 14 of the capsule 2. The lid piercing means 26 may be arranged to tear the lid 14 once a (fluid) pressure inside the inner space 22 exceeds a threshold pressure and presses the lid 14 against the lid piercing means 26 with sufficient force. The lid 14 may e.g. comprise a tearable foil, e.g. made of aluminium.

In this example, the cup 12 further comprises a plurality of projections in the form of substantially concentric circumferential ridges 28.$i$ (i=1, 2, 3). In this example, the ridges 28.$i$ are arranged on the flange-like rim 20. Here the ridges 28.$i$ are arranged on the side of the flange-like rim 20 facing away from the lid 14. More generally put, the ridges 28.$i$ extend outwardly of the cup 12. In this example the ridges 28.$i$ are made of the same material as the cup 12. In this example, the ridges 28.$i$ are integral with the cup 12.

As can be seen from FIG. 1, in use the ridges 28.$i$ may abut against a leading edge 30 of the enclosing member 6. When in this example at least one ridge 28.$i$ abuts against at least a portion of the leading edge 30 of the enclosing member 6, a sealing engagement is obtained between the enclosing member 6 and the capsule 2 at the location where the at least one ridge 28.$i$ abuts against at least the portion of the leading edge 30 of the enclosing member 6.

The system 1 shown in FIG. 1 is operated as follows for preparing a cup of coffee, wherein the extractable product is roasted and ground coffee.

The capsule 2 is placed in the enclosing member 6. The support member 8 is brought into contact with the capsule 2. The bottom piercing means 24 pierce the bottom 18 of the capsule 2 for creating the entrance openings 25. The fluid, here hot water under pressure, is supplied to the extractable product in the inner space 22 through the entrance openings 25. The water will wet the coffee grounds and extract the desired substances to form the coffee beverage.

During supplying the water under pressure to the inner space 22, the pressure inside the capsule 2 will rise. The rise in pressure will cause the lid 14 to deform and be pressed against the lid piercing means 26. Once the pressure reaches a certain level, the tear strength of the lid 14 will be surpassed and the lid will rupture against the lid piercing means 26, creating exit openings. The prepared coffee will drain from the capsule 2 through the exit openings and outlets 32 of the support member 8, and may be supplied to a container such as a cup (not shown).

Figure 2:
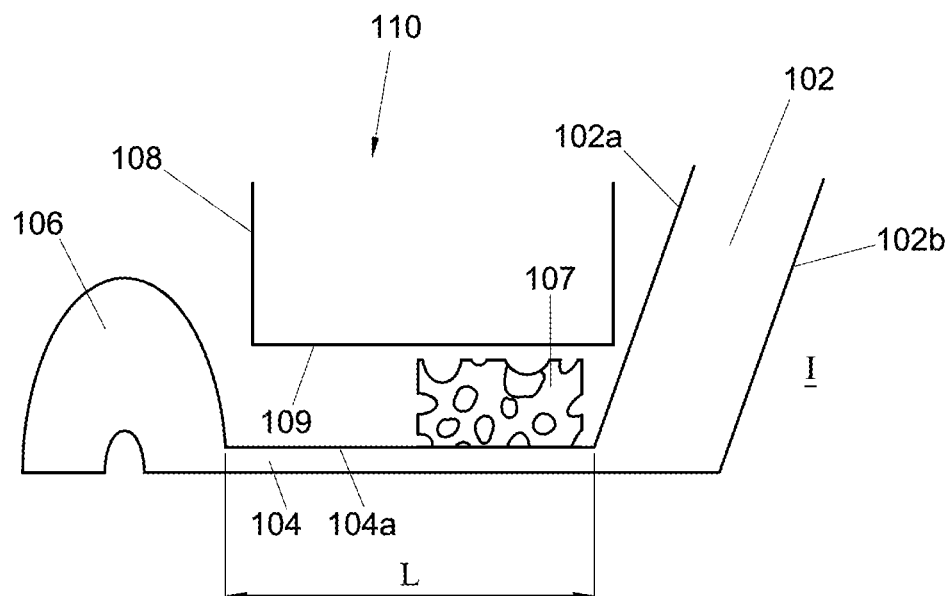
FIG. 2 presents a schematic view of an embodiment of a capsule according to an aspect of the invention.

FIG. 2 presents a schematic view of another embodiment of a capsule according to an aspect of the invention. In this figure a schematic vertical cross-section of a portion of the capsule is shown. The capsule 110 comprises a wall 102 having an inner surface 102$b$ conceived to define at least a portion of the inner space I for accommodating the extractable product. The outer surface 102$a$ of the capsule may be orthogonally or obliquely arranged with respect to the flange-like rim 104. The flange-like rim 104 comprises an upper surface 104$a$ conceived to undergo interaction with a surface 109 of a receptacle 108 of the beverage brewing device. The flange-like rim 104 may have a substantially flat portion between the base of the wall 102$a$ and a terminal ring 106. The terminal ring 106 may be provided to centre the receptacle 108 with respect to the capsule. It will be appreciated that the receptacle 108 may be shaped to receive the capsule 110 so that the portion 108 substantially envelopes it.

In accordance with an aspect of the invention in order to form a sealing engagement between the capsule 110 and the surface 109 of the receptacle in use, a portion of the surface 104$a$ is provided with a projection 107. It will be appreciated that the projection 107 may be arranged substantially anywhere along width L of the flange-like rim. Also the way the projection 107 is used for forming a sealing engagement may be different.

First, the projection 107 may be arranged in an area wherein the wall 102 intercepts the flange-like rim 104 so that the surface 109 substantially abuts the projection 107. This has an advantage that the projection may be slightly compressed so that local surface irregularities of the receptacle 108 are mitigated. For example, when for the projection a material is selected capable of retaining fluid, microscopic leakages from the rim-receptacle interface may be counteracted.

Secondly, the projection 107, for example the sponge-like body, may be arranged close to the outer ring 106 so that it may next to abutting the surface 109 of the receptacle also engage with a vertical outer surface of it. In this case the sponge-like projection may provide an improved sealing engagement as the outermost surface of the receptacle 108 may be at least partially enveloped by the sponge-like body 107.

Figure 3:
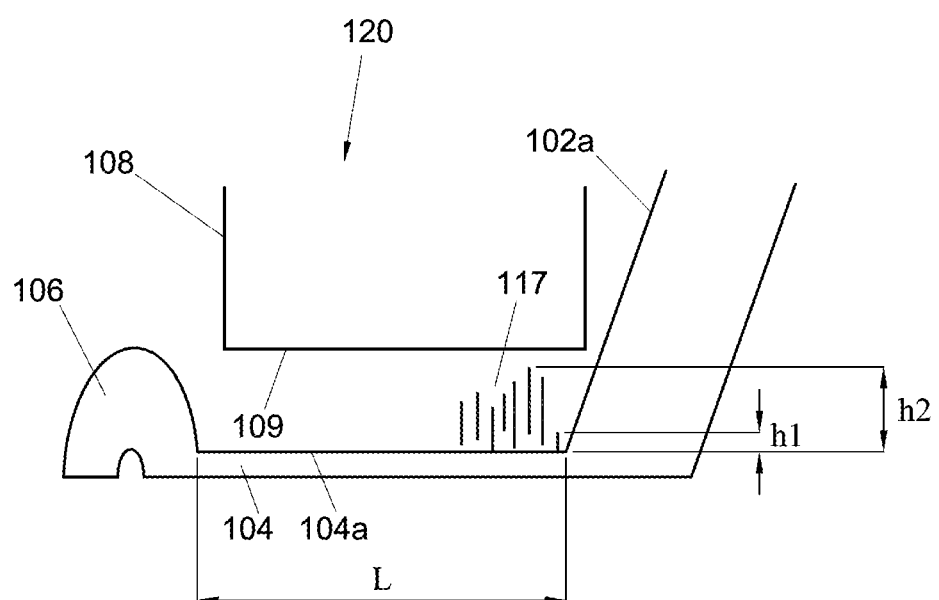
FIG. 3 presents a schematic view of an embodiment of a capsule according to an aspect of the invention.

FIG. 3 presents a schematic view of an embodiment of a capsule according to an aspect of the invention, wherein geometry of the capsule 120 and of the receptacle 108 are substantially the same as discussed with reference to FIG. 2.

In this particular embodiment the projection comprises a plurality of individual elongated members 117, wherein the individual elongated members may have the same height or may have different heights h1, h2. It will be appreciated that various embodiments of the individual elongated members are envisaged. First, the members may be provided as a brush-like structure, which may be adhered to the surface 104$a$ using a suitable adhesive. The individual members may be manufactured from plastic, synthetic hair or the like. The individual members may e.g. be made of the same material as the cup 102, 104, 106. The individual members may e.g. be integral with the cup, e.g., by injection moulding of the cup and the members simultaneously. The projection 117 may be provided as a circumferential structure along a periphery of the capsule's rim. Preferably, the circumferential structure is concentric with a rotational axis of the capsule (not shown). Also, more than one circumferentially arranged projections 117 may be provided. For example, one circumferential projection may be provided at or near a rim-wall interface and a second circumferential projection may be provided at a rim/ring interface thereby providing a second barrier for possible microscopic leakages. Additionally or alternatively, the projection 117 may be provided as a number of isolated islands along the surface 104$a$. Such islands may be provided in a two-dimensional pattern, e.g. a chequered pattern, or they may be provided along other suitable pattern. In the example of FIG. 3, the individual members are drawn as being straight. It will be appreciated that tit is also possible that the individual members are curved or curled. It will be appreciated that the members may be intertwined e.g. forming a fleece-like structure. Such fleece-like structure may be injection moulded together with the cup.

Figure 4:
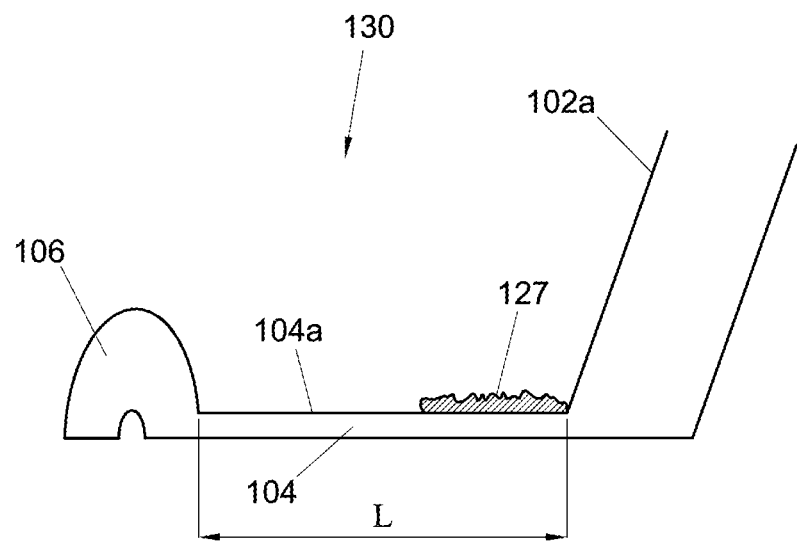
FIG. 4 presents a schematic view of an embodiment of a capsule according to an aspect of the invention.

FIG. 4 presents a schematic view of an embodiment of a capsule according to an aspect of the invention, wherein geometry of the capsule 130 and of the receptacle 108 are substantially the same as discussed with reference to FIG. 2.

In this particular embodiment the at least one projection comprises a textured material 127, which may be provided anywhere along width L of the surface 104a. Also in this case the projection 127 may be provided as one or more circumferential structures or as individual regions. The material 127 preferably comprises depressions and projections. Preferably, a height difference between adjacent depressions and projections is at least about 0.5 mm.

Figure 5:
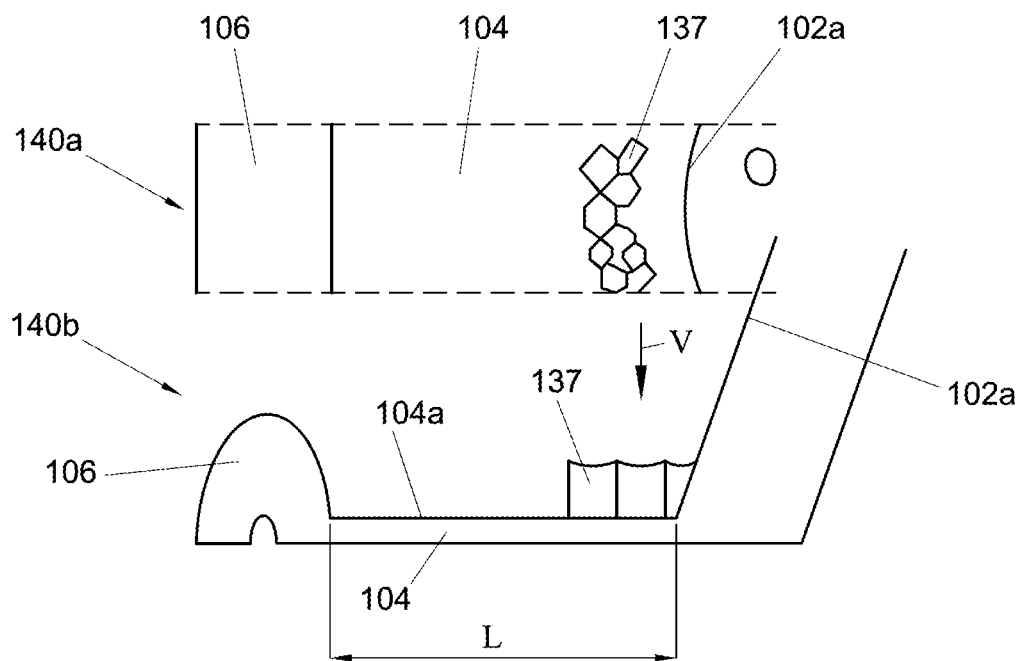
FIG. 5 presents a schematic view of an embodiment of a capsule according to an aspect of the invention.

FIG. 5 presents a schematic view of an embodiment of a capsule according to an aspect of the invention, wherein geometry of the capsule 140b and of the receptacle 108 are substantially the same as discussed with reference to FIG. 2.

In a top view 140a a capsule portion is depicted wherein on the surface 104a between the ring 106 and the wall 102a a projection is provided comprising a number of interconnected tubular structures. Although in this particular example honeycomb tubular structures are shown any cross-sectional shape is possible. A polygonal cross-section may be preferred as any tubular structure is connected to a plurality of adjacent tubular structures increasing flexibility of such projection in a vertical direction V.

The tubular structure may be provided along a circumference of the surface 104a, or it may be provided at selected regions. The projection comprising hollow tubular bodies may have an advantage that these bodies may easily be compressed by the receptacle (not shown) for forming the sealing engagement. Inner volume of the tubular bodies may be used as microscopic vessels for receiving fluid escaping from the sealing engagement, which may further improve the sealing engagement.

Figure 6:
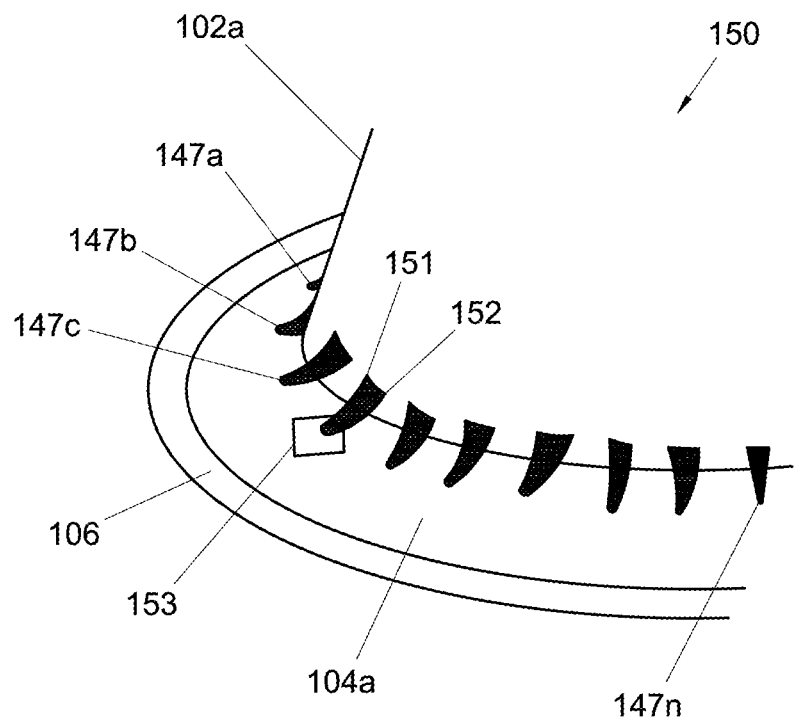
FIG. 6 presents a schematic view of an embodiment of a capsule according to an aspect of the invention.

FIG. 6 presents a schematic view of an embodiment of a capsule according to an aspect of the invention, wherein geometry of the capsule 150 and of the receptacle 108 are substantially the same as discussed with reference to FIG. 2.

In this particular embodiment the at least one projection is provided as a bridge between the surface 104a and the wall 102a. Preferably a plurality of bridges 147a, 147b, 147c, ..., 147n are provided. It will be appreciated that the bridge structure may be provided as an oblique link having a base portion 153 on the surface 104a and end portions terminating on the wall 102a. Alternatively, the bridge may be provided as a triangular or prismatic filling between the surface 104a and the wall 102a. In both cases the bridge may have two or more bifurcations 151, 152 having the same base and splitting and the wall 102a. It will further be appreciated that although the base portion 153 is schematically depicted to be arranged near the rim/wall interface, it may be positioned substantially distanced from said interface. Also, it is possible, that different isolated bridge structures have differently positioned base portions. Alternatively, it is possible that a one circumferentially arranged bridge structure is provided connecting the rim surface 104a and the wall 102.

Figure 7:
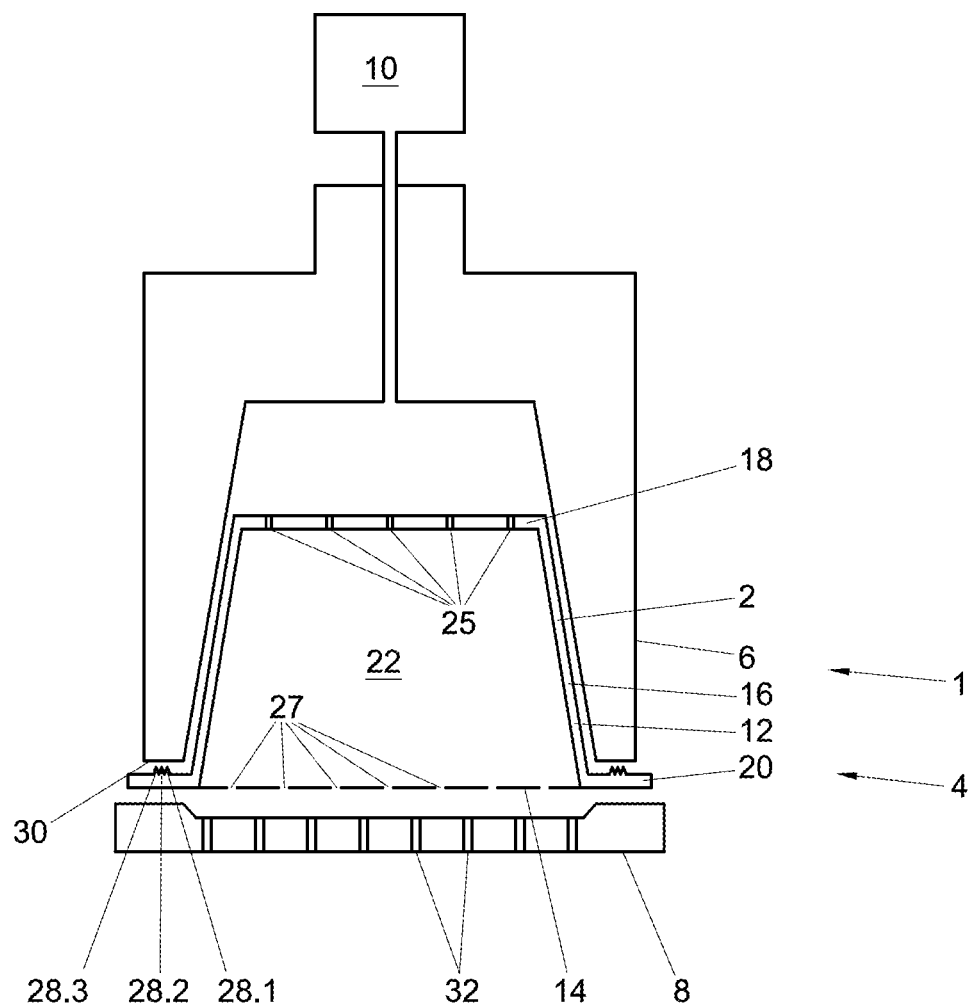
FIG. 7 shows a schematic representation of a second example of a system according to the invention.

FIG. 7 shows a schematic representation, in cross sectional view, of a second example of a system 1 discussed with reference to FIG. 1 for preparing a predetermined quantity of beverage suitable for consumption using an extractable product. The system 1 comprises an exchangeable capsule 2, and a beverage brewing device 4. The device 4 comprises a receptacle, here enclosing member 6, for holding the exchangeable capsule 2. In this example, the device 4 further comprises a support member 8 for supporting the capsule 2.

In FIG. 7 a gap is drawn between the capsule 2, the enclosing member 6 and the support member 8 for clarity. It will be appreciated that, in use, the capsule 2 may lie in contact with the enclosing member 6 and the support member 8. Commonly, the enclosing member 6 has a shape complementary to the shape of the capsule 2. The apparatus 4 further comprises a fluid dispensing device 10 for supplying an amount of a fluid, such as water, under a pressure, of e.g. 9 bars, to the exchangeable capsule 2.

In the example shown in FIG. 7, the exchangeable capsule 2 comprises a cup 12 and a lid 14. In this example, the cup 12 comprises a circumferential wall 16, a bottom 18 closing the circumferential wall 16 at a first end, and a flange-like rim 20 extending outwardly of the circumferential wall 16 at a second end opposite the bottom 18 wall. The circumferential wall 16, the bottom 18 and the lid 14 enclose an inner space 22 comprising the extractable product. In this example, the capsule is initially open. Hence, the capsule 2 comprises pre-made entrance openings 25. The entrance openings 25 may be through holes in the bottom 18. Further, the capsule 2 comprises premade exit openings 27. The exit holes 27 may be through holes in a foil-like lid 14, e.g. manufactured from plastics material, or may be pores in a porous lid, e.g. manufactured from a non-woven material such as filter paper.

The system 1 of FIG. 7 does not comprise bottom piercing means nor lid piercing means 26.

In this example, the cup 12 further comprises a plurality of substantially concentric circumferential ridges 28.i (i=1, 2, 3, ...). In this example, the ridges 28.i are arranged on the flange-like rim 20. Here the ridges 28.i are arranged on the side of the flange-like rim 20 facing away from the lid 14. More generally put, the ridges 28.i extend outwardly of the cup 12. In this example the ridges 28.i are made of the same material as the cup 12. In this example, the ridges 28.i are integral with the cup 12.

As can be seen from FIG. 7, in use the ridges 28.i may abut against a leading edge 30 of the enclosing member 6. When in this example at least one ridge 28.i abuts against at least a portion of the leading edge 30 of the enclosing member 6, a sealing engagement is obtained between the enclosing member 6 and the capsule 2 at the location where the at least one ridge 28.i abuts against at least the portion of the leading edge 30 of the enclosing member 6.

The system 1 shown in FIG. 7 is operated as follows for preparing a cup of coffee, wherein the extractable product is roasted and ground coffee.

The capsule 2 is placed in the enclosing member 6. The support member 8 is brought into contact with the capsule 2. The fluid, here hot water under pressure, is supplied to the extractable product in the inner space 22 through the entrance opening 25. The water will wet the coffee grounds and extract the desired substances to form the coffee beverage.

During supplying the water under pressure to the inner space 22, the pressure inside the capsule 2 may rise. The prepared coffee will drain from the capsule 2 through the exit openings 27 and outlets 32 of the support member 8, and may be supplied to a container such as a cup (not shown).

Figure 8A:
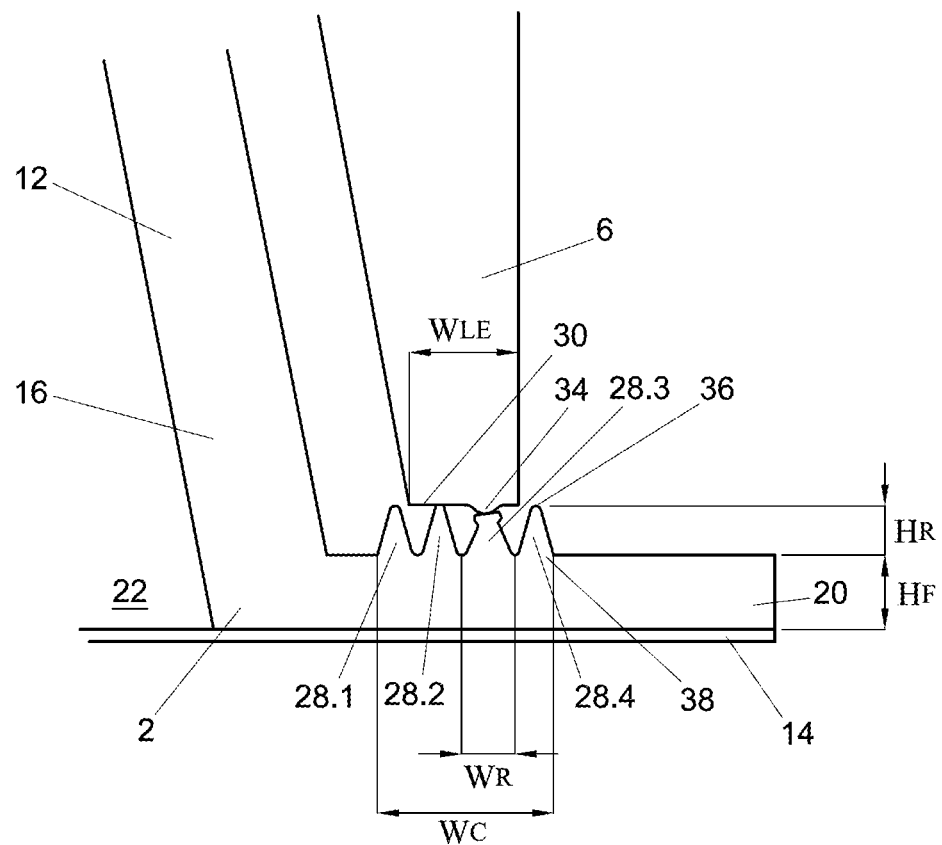
FIG. 8a shows an enlarged detail of a part of the system according to the invention.
Figure 8B:
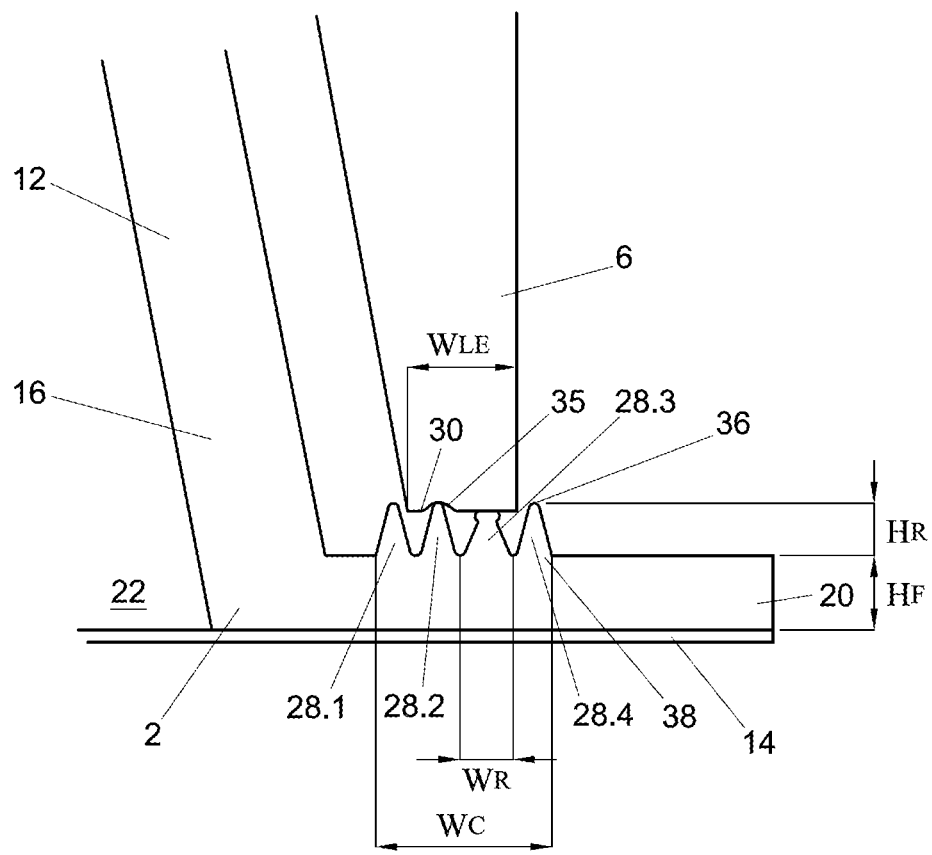
FIG. 8b shows an enlarged detail of a part of the system according to the invention.

FIGS. 8a and 8b show an enlarged detail of a part of the system 1 according to the invention. In this example four circumferential ridges 28.i are arranged on the flange-like rim 20. Here, the ridges 28.i are integral with the rim 20. In this example the ridges 28.i are arranged concentrically with respect to each other. In this example the ridges 28.i are also arranged concentrically with an axis of the cup 12.

In FIG. 8a the leading edge 30 of the enclosing member 6 comprises an irregularity in the form of a protrusion 34, e.g. a bulge, a burr or a lump (e.g. caked-on debris). It can be seen that in this example one particular ridge 28.3 of the ridges 28.i abuts the protrusion 34 and is locally more compressed. Hence, the ridges 28.i and the enclosing member 6 are in sealing engagement despite the presence of the protrusion 34.

In FIG. 8b the leading edge 30 of the enclosing member 6 comprises an irregularity in the form of a recess 35 or depression, e.g. a dent, scratch or a crevice. It can be seen that in this example one particular ridge 28.2 of the ridges 28.i faces the recess 35. A neighbouring ridge 28.3 will, accordingly, be locally more compressed and abut the leading edge 30 of the enclosing member 6. Hence, the ridges 28.i and the enclosing member 6 are in sealing engagement despite the presence of the recess 35.

In the examples of FIGS. 8a and 8b, each of the ridges 28.i has a substantially triangular cross section. This provides the advantage that compression of the ridges 28.i requires a progressively increasing force. Hence, each ridge 28.i can easily follow the contour of the irregularity of the enclosing member 6.

In the examples of FIGS. 8a and 8b, all ridges have substantially the same height $H_R$ prior to use, e.g. prior to being compressed. Hence, all ridges 28.i may equally contribute to the sealing engagement between the capsule 2 and the enclosing member 6. Hence, a misalignment between the capsule 2 and the enclosing member 6 may be tolerated, without the leading edge 30 failing to abut any ridge 28.i.

In the examples of FIGS. 8a and 8b the ridges 28.i each have a maximum individual width $W_R$ that is less than the width $W_{LE}$ of the leading edge 30 of the enclosing member 6. Thus, each ridge 28.i is narrow relative to the leading edge 30, so that each ridge 28.i can easily be compressed by the leading edge 30. Further, here the plurality of ridges 28.i has a combined width We that is larger than the width $W_{LE}$ of the leading edge 30 of the enclosing member 6. Hence, a misalignment between the capsule 2 and the enclosing member 6 may be tolerated, without the leading edge 30 failing to abut any ridge 28.i. It will be appreciated that in general the width of individual members of the at least one protrusion may be less than the width of the portion of the receptacle arranged to interact with the capsule. It will also be appreciated that in general the width of the at least one protrusion may be larger than the width of the portion of the receptacle arranged to interact with the capsule.

In these examples, the width $W_R$ of each of the ridges 28.i is smaller than the height $H_R$ of that ridge prior to use. Hence the ridges 28.i have a slender form, allowing easy deformation of the ridges 28.i, e.g. by compression of a top edge 36 of the ridges towards a base 38 of the ridges 28.i. Hence, the ridges 28.i may easily follow the irregularity in the enclosing member 6 at the location of the sealing engagement. It is noted that herein the width $W_R$ of the ridge is measured parallel to the plane onto which the ridge is arranged and that the height $H_R$ of the ridge is measured orthogonal to the width.

In these examples, the width $W_R$ each of the ridges 28.i is less than a thickness $H_F$ of the flange-like rim 20. Also in these examples, the height $H_R$ of each of the ridges 28.i prior to use is less than the thickness $H_F$ of the flange-like rim 20. Hence, a resistance against compression of the ridges 28.i may be less than a resistance against compression of the rim 20. In these examples the rim 20 will be rigid relative to the ridges 28.i, while the ridges 28.i may possess enough compressibility due to their shape and dimensions to provide the sealing engagement with the enclosing member 6 even if the enclosing member comprises the irregularity at the location of the sealing engagement. It will be appreciated that the ratio of the resistance against compression of the ridges 28.i to the resistance against compression of the rim 20 may be further improved by increasing the thickness of the rim 20 at least locally at the position of the ridges 28.i.

The geometry of the ridges 28.i allows the ridges 28.i to adapt to an irregularity at the enclosing member 6, even if a material is chosen which allows the remainder of the cup 12 to be substantially rigid. Such substantially rigid cup 12 may increase the ease of handling of the capsule 2. It is for instance possible that the ridges 28.i are unitary with the flange-like rim 20, circumferential wall 16, and optionally the bottom 18, e.g. of a plastics material. It has been found that in such case the cup 12 may be substantially rigid, while the ridges 28.i may cooperate with the enclosing member 6 to provide the sealing engagement even if the chosen plastics material has a shore D hardness of 70 or more.

In these examples, the thickness of the rim 20 is approximately 0.2 mm. In these examples, the width of the leading edge 30 of the enclosing member 6 is approximately 0.7 mm. In these examples the height $H_R$ of each of the ridges 28.i is approximately 0.2 mm prior to use. Preferably the height $H_R$ is more than 0.3 mm, more preferably more than 0.21 mm, it is also possible that the height $H_R$ is more than 0.15 mm prior to use. In these examples the maximum width $W_R$ of each of the ridges 28.i is approximately 0.14 mm. Preferably, the width $W_R$ is more than 0.3 mm, more preferably more than 0.21 mm, most preferably more than 0.15 mm. These dimensions have been found to provide good sealing engagement between the ridges 28.i and the enclosing member 6.

In the examples of FIGS. 8a and 8b the ridges 28.i are spaced radially such that two neighbouring ridges substantially abut radially. More in general, the radial distance between two neighbouring ridges 28.i is preferably less than the maximum width $W_R$ of the ridges 28.i, more preferably less than 50% of the maximum width $W_R$, most preferably less than 25% of the maximum width $W_R$. Thus, the ridges 28.i are spaced closely together, allowing a good chance that at least one of the ridges 28.i properly abuts against the leading edge 30 of the enclosing member 6. Also, the closely spaced ridges 28.i allow for increased tolerance to misalignment of the capsule 2 with respect to the enclosing member 6, since the narrow space between the ridges 28.i may form a labyrinth providing sufficient resistance against fluid flow to provide a sufficient sealing engagement, even if not one single ridge 28.i fully abuts against the enclosing member 6.

In a preferred embodiment according to FIG. 8a or FIG. 8b, the ridges 28.i are integrally formed with the cup 12. The ensemble of the cup 12 and ridges 28.i may e.g. be injection moulded in one piece. The ensemble may be formed from a plastics material, such as for instance polypropylene.

In a preferred embodiment the material of the ridges 28.i is chosen to be plastically deformable. Preferably, the ridges 28.i, at least the tops 36 of the ridges may be plastically deformed upon contact with the enclosing member 6. The plastically deforming ridges 28.i may easily adapt to an irregularity of the enclosing member 6 at the location of the sealing engagement.

It will be appreciated that the details of FIGS. 8a and 8b may be applied to the system described in view of FIG. 1 as well as to the system described in view of FIG. 7.

Figure 9:
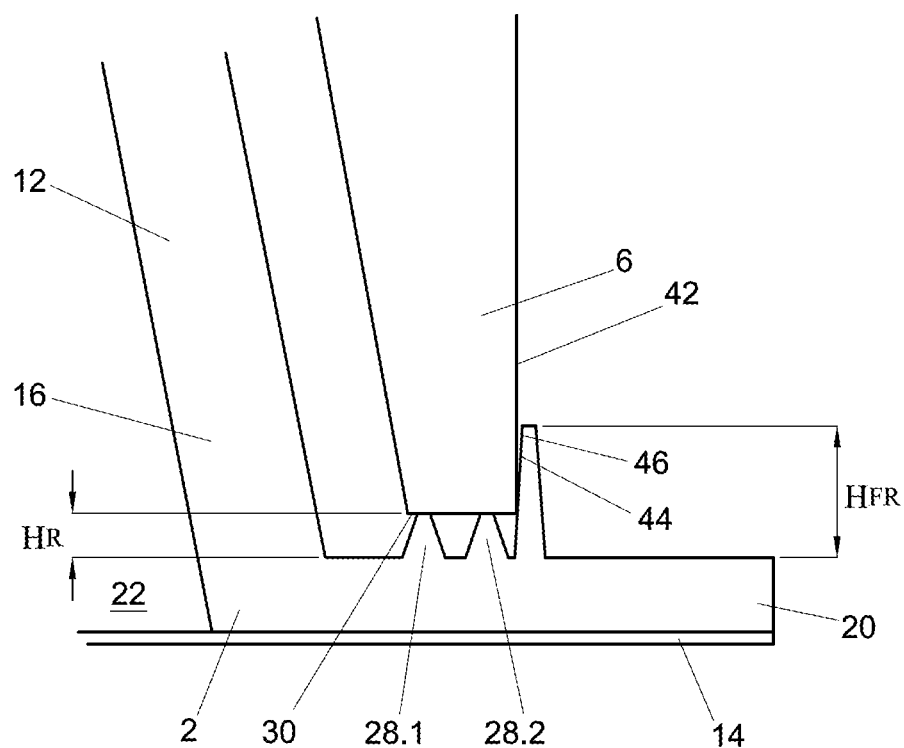
FIG. 9 shows an enlarged detail of a part of the system according to the invention.

FIG. 9 shows an enlarged detail of a part of an elaborate system 1 according to the invention. In this example, in addition to the plurality of ridges 28.i, the capsule 2 comprises a further ridge 40.

In FIG. 9 the further ridge 40 is arranged on the flange-like rim 20, on the side facing away from the lid 14. Here, the further ridge 40 is integral with the flange-like rim 20. In this example, the further ridge 40 is substantially concentric with the ridges 28.i. Here the further ridge 40 is positioned circumscribing the ridges 28.i. It will be noted that a height $H_{FR}$ of the further ridge 40 is different from the height $H_R$ of the ridges 28.i. In this example, the height $H_{FR}$ of the further ridge 40 is larger than the height $H_R$ of the ridges 28.i.

In this example, the further ridge 40 is arranged to abut against an outer circumferential surface 42 of the enclosing member 6. The outer circumferential surface 42 may be wedged against the inner circumferential surface 44 of the further ridge 40. In order to facilitate insertion of the enclosing member 6 within the perimeter of the further ridge 40, the further ridge 40 may comprise a conical section 46 on the inner circumferential surface 44.

Thus, in this example at least one of the ridges 28.i abuts against the enclosing member 6, and additionally, the further ridge 40 abuts against the enclosing member 6. Hence, an improved sealing engagement between the capsule 2 and the enclosing member 6 may be obtained.

It will be appreciated that the further ridge 40 may also be applied in the situations described with respect to FIGS. 1, 7, 8a and 8b. It will be appreciated that the further ridge 40 may also be used in conjunction with any one of the protrusions discussed with respect to FIGS. 2-6.

Figure 10A:
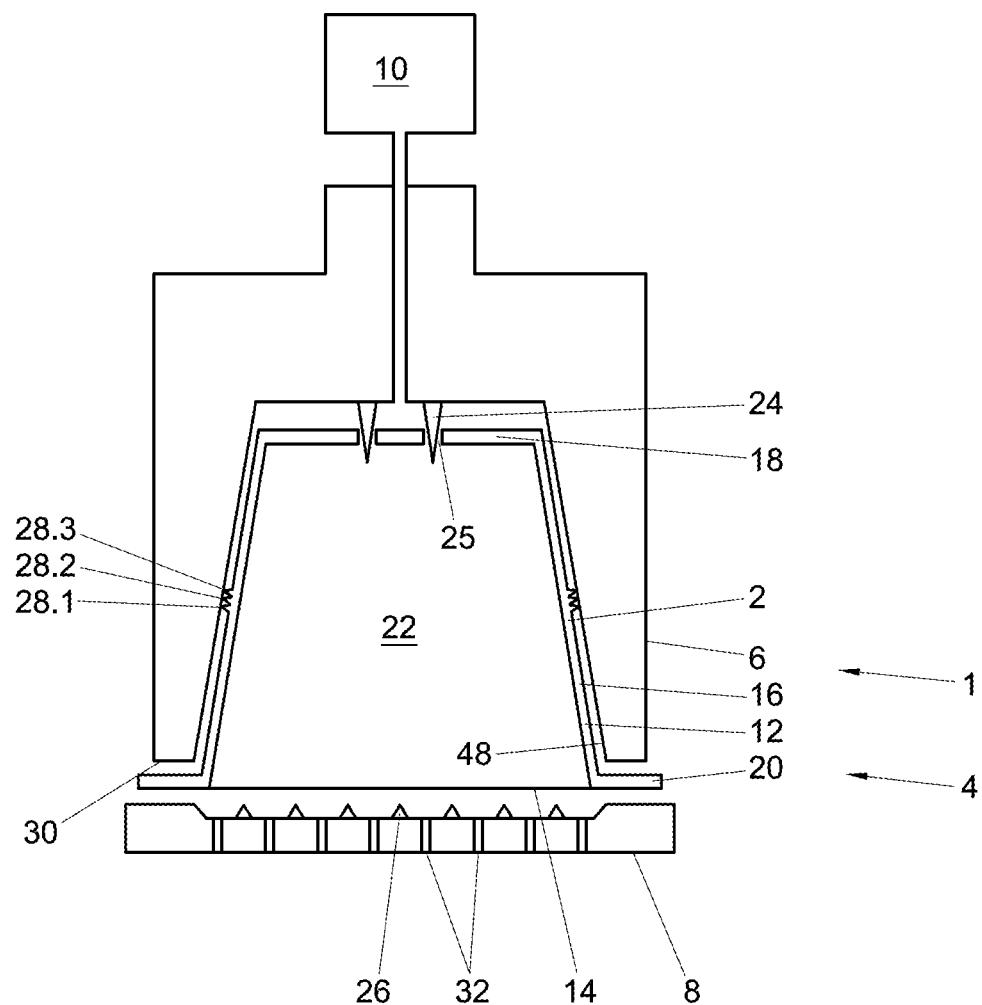
FIG. 10a shows a schematic representation of a further example of a system according to the invention.

FIG. 10a shows a schematic representation of a further example of a system 1 according to the invention. The system 1 shown in FIG. 10a is substantially identical to the system shown in FIG. 1. In FIG. 10a, however, the location of the at least one projection, here ridges 28.i, on the cup 12 is different. In this example, the at least one projection, here ridges 28.i, is located on the circumferential side wall 16 of the cup 12. Here, the at least one projection, here ridges 28.i, abuts against an inner circumferential surface 48 of the enclosing member 6. In FIG. 10a the at least one projection, here ridges 28.i, and the inner circumferential surface 48 are in sealing engagement. It will be appreciated that also in the system shown in FIGS. 2-7 the at least one projection, e.g. the ridges 28.i, may be located on the circumferential side wall 16 of the cup 12.

Figure 10B:
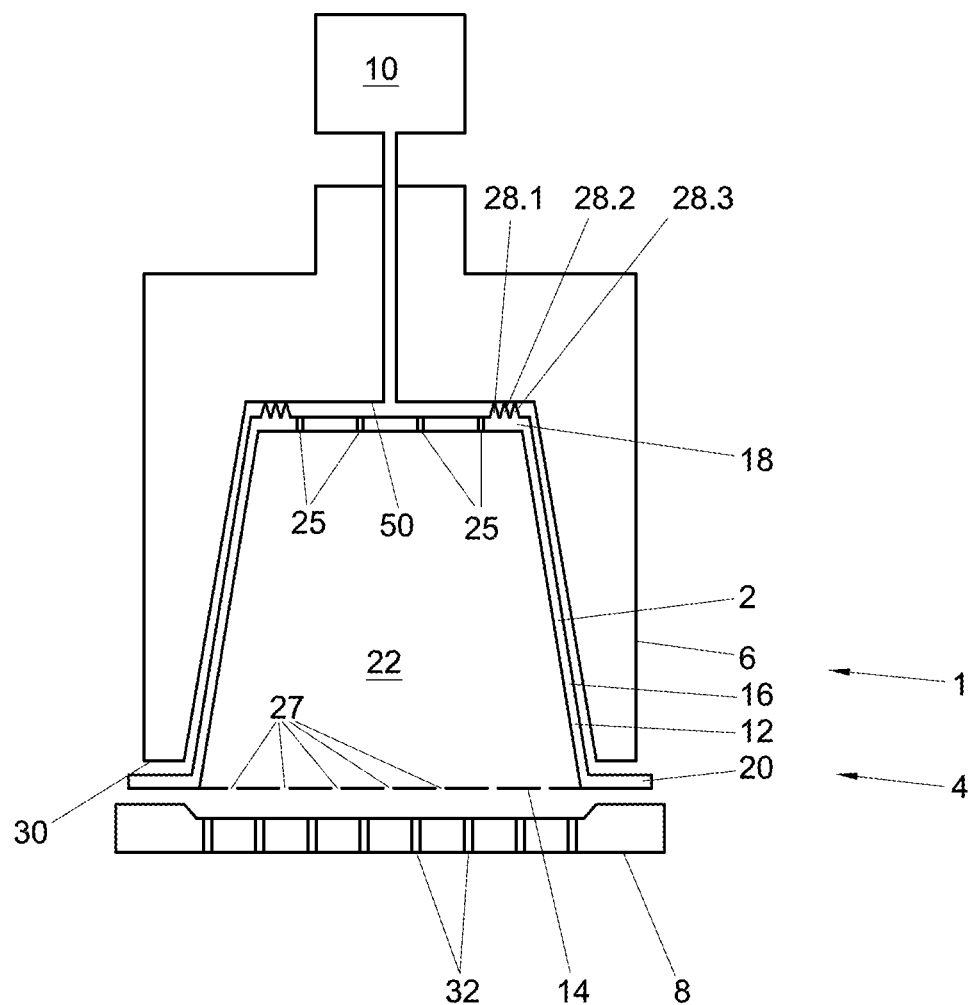
FIG. 10b shows a schematic representation of an even further example of a system according to the invention.

FIG. 10b shows a schematic representation of a further example of a system 1 according to the invention. The system 1 shown in FIG. 10b is substantially identical to the system shown in FIG. 7. In FIG. 10b, however, the location of the at least one projection, here the ridges 28.i, on the cup 12 is different. In this example, the at least one projection, here the ridges 28.i, is located on the outer surface of the bottom 18 of the cup 12. Here, the at least one projection, here ridges 28.i, abuts against an inner back surface 50 of the enclosing member 6. In FIG. 10b the at least one projection, i.e. the ridges 28.i, and the inner back surface 50 are in sealing engagement. It will be appreciated that also in the system shown in FIGS. 1-6 the at least one protrusion, e.g. the ridges 28.i, may be located on the outer surface of the bottom 18 of the cup 12.

Figure 11:
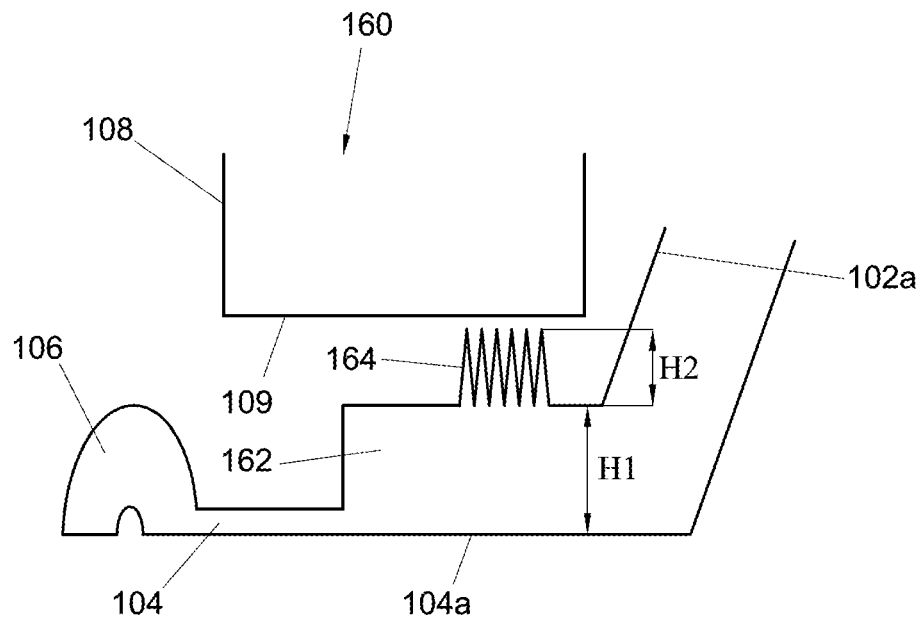
FIG. 11 presents in a schematic way an embodiment of a further example of a capsule according to the invention.

FIG. 11 presents in a schematic way an embodiment of a further example of a capsule according to the invention. View 160 presents schematically a portion of an axial cross-section of the capsule according to a further aspect of the invention. It will be appreciated that general details not discussed with reference to this Figure may be found with reference to FIG. 2.

In accordance with a present aspect of the invention the capsule 160 and the surface 109 of the receptacle in use form a substantially sealing engagement when the surface 109 of the receptacle 108 intercepts the elongated structures 164.

Preferably, the height of the flange-like rim 104 at a periphery of the capsule 160 near the outer ring 106 may be about 0.2 mm. The elongated structures 164 may be provided on a projection 162, which may be as high as 0.5-0.7 mm counting from the bottom surface 104a of the flange-like rim, see item H1. The elongated structures 164 may be about 0.25 mm high (see item h2) leading to a total elevation of the flange-like rim at this are to 0.8-1 mm.

It was found that by providing the local elevation of the flange-like rim in an area adjacent or connecting to the outer surface of the capsule 102a an improved sealing engagement between the capsule and the receptacle is obtained. Due to the fact that the elongated structures may be depressed of otherwise deformed individually the quality of the sealing engagement is substantially improved.

Figure 12:
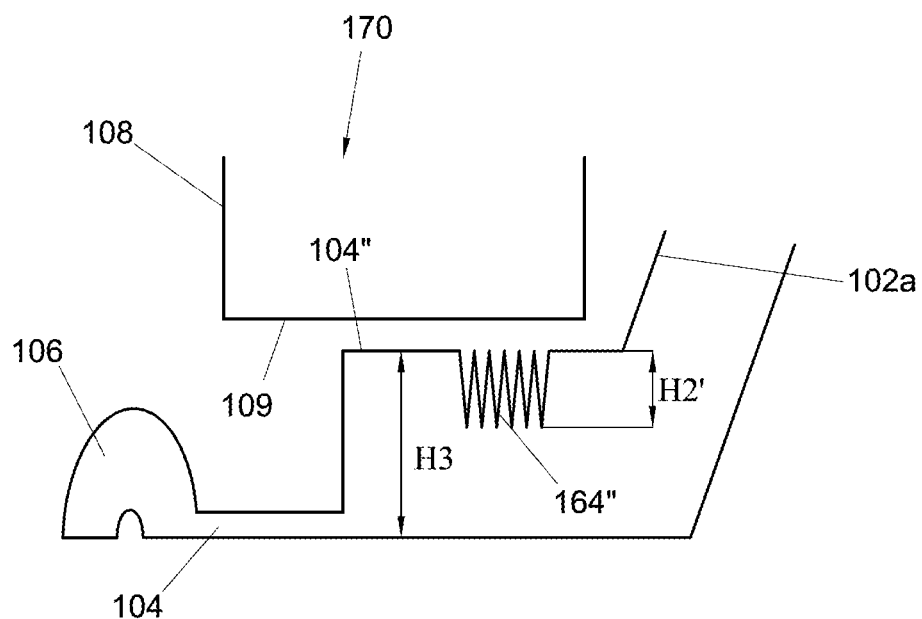
FIG. 12 presents in a schematic way an embodiment of a still further example of a capsule according to the invention.

FIG. 12 presents in a schematic way an embodiment of a still further example of a capsule according to the invention. In this embodiment two variants are shown which may be used individually or in combination.

For the sake of simplicity, items discussed with reference to FIGS. 2 and 11 will be not repeated here unless modified.

In a first embodiment, the surface of the flange-like rim may be elevated as a whole to a level H3, which may be as high as 0.8-1.0 mm. It this way a substantially elevated projection is provided which may be seamlessly connected to the outer surface of the capsule 102a. Preferably, the projection 104" is made of a substantially soft and deformable material. More preferably, the capsule is made from the same soft and deformable material whereby the projection 104" is inherently integrated with it. For example, such structure may be provided by suitable molding techniques.

Secondly, the elevated projection 104" may be provided with elongated projections 164" which may be provided as suitable grooved in the body of the projection 104. In this way local deforming properties of the projection are substantially increased as the elongated structures 164" may be deformed individually. It will be appreciated that the elongated structures may be provided on a portion of the elevated projection 104", or they may cover its whole lateral surface.

Figure 13:
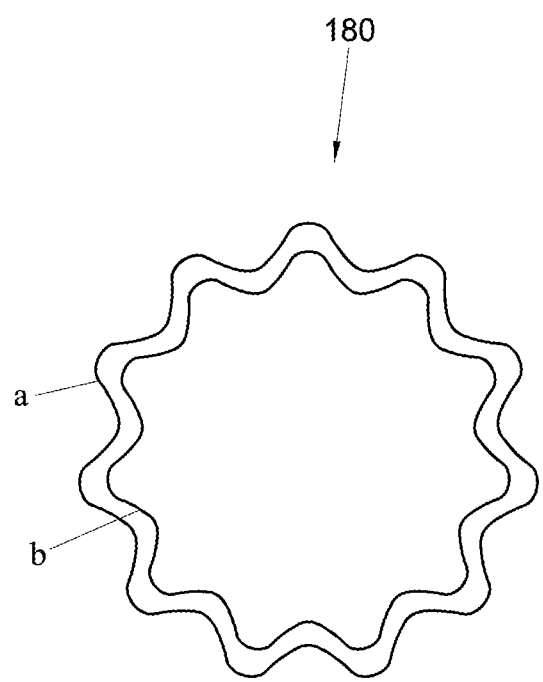
FIG. 13 presents in a schematic way a top view of an embodiment of a circumferential projection.

FIG. 13 presents schematically a top view of a suitable circumferential projection having an irregular shape. The projection 180 is arranged on the flange-like rim, in such a way that it runs across a path conceived to be occupied by a surface of the receptacle in use. It will be appreciated that a suitable plurality of variants of the shape of the projection 180 is possible, including zigzags, labyrinths and so forth. Also, a plurality of coherent irregular shapes a, b may be provided.

In the foregoing specification, the invention has been described with reference to specific examples of embodiments of the invention. It will, however, be evident that various modifications and changes may be made therein without departing from the broader spirit and scope of the invention as set forth in the appended claims.

It is for instance possible that the capsule as shown in FIG. 7 is used in the system of FIG. 1. It is possible that in such instance the capsule is designed such that the bottom is not pierced by the bottom piercing means. It is also possible that the lid and the lid piercing means are designed such that the lid is not torn under the effect of fluid pressure in the inner space of the capsule.

It will be appreciated that if the enclosing member has the leading edge for abutting the flange-like rim of the capsule, this leading edge may also comprise irregularities in the form of a plurality of radially extending grooves. Also in such case a sealing engagement may be obtained between the leading edge of the enclosing member and the ridges of the capsule according to the invention.

It is possible that the capsule is provided as a fillable or refillable capsule that can be filled or refilled by a user, respectively. Such capsule may be provided as a separate cup and lid that may be connected to the cup by the user after filling the capsule with a beverage ingredient. Alternatively, the lid may be partially, e.g. hingedly, connected to the cup so the user can connect the lid to substantially the entire perimeter of the flange-like rim after filling the cup with the beverage ingredient.

In the examples, the plurality of ridges comprises three or four ridges. It will be appreciated that also another number of ridges may be used, such as two, five or six ridges.

It will be appreciated that while specific embodiments of the invention have been described above, that the invention may be practiced otherwise than as described. In addition, isolated features discussed with reference to different figures may be combined.

However, other modifications, variations and alternatives are also possible. The specifications, drawings and examples are, accordingly, to be regarded in an illustrative rather than in a restrictive sense.

In some embodiments, a capsule for preparing a predetermined quantity of beverage suitable for consumption using an extractable product, by means of a beverage brewing device comprising a receptacle for receiving the capsule, includes a cup comprising a circumferential wall, a bottom closing the circumferential wall at a first end, and a lid in use connected to the cup at a second end of the circumferential wall opposite the bottom, wherein the wall, bottom and lid, in use, enclose an inner space comprising the extractable product, and wherein at least a portion of a surface of the capsule conceived to, in use, interact with the receptacle is provided with at least one projection for forming a sealing engagement with the receptacle.

In some embodiments, the cup further comprises a flange-like rim extending outwardly of the circumferential wall at the second end, wherein the at least one projection is provided on the flange-like rim.

In some embodiments, the at least one projection is circumferential with respect to the capsule.

In some embodiments, the at least one projection is provided on separate regions along a periphery of the capsule.

In some embodiments, a height of the at least one projection is modulated.

In some embodiments, the at least one projection comprises a circumferential ridge.

In some embodiments, the at least one projection comprises a plurality of circumferential ridges.

In some embodiments, said at least one projection is not a plurality of concentric circumferential ridges made of the same material as the cup provided on the flange-like rim.

In some embodiments, the at least one projection comprises a body capable of retaining fluid.

In some embodiments, said body comprises a sponge.

In some embodiments, a plurality of elongated individual projections is provided, said projections forming a brush-like area.

In some embodiments, at least one of the elongated individual projections has a different height than the other elongated individual projections.

In some embodiments, the height of the elongated individual projections is in the range of 0.1 to 2 mm, preferably in the range of 0.13 to 1 mm, more preferably in the range from 0.15 to 0.5 mm.

In some embodiments, the at least one projection comprises a textured material.

In some embodiments, the textured material comprises an elevated area and a depressed area, a height difference between the elevated area and the depressed area being at least 0.05 mm, preferably at least 0.15 mm.

In some embodiments, the at least one projection comprises a plurality of interconnected tubular structures.

In some embodiments, the plurality of interconnected tubular structures comprises polygonal structures, preferably honeycomb structures.

In some embodiments, the tubular structures are hollow.

In some embodiments, the at least one projection comprises an oblique bridge extending between the flange-like rim and the wall.

In some embodiments, the bridge comprises two or more branches bifurcating from a base portion attached to the flange-like rim.

In some embodiments, the at least one projection is flexible.

In some embodiments, the at least one projection is elastically deformable.

In some embodiments, the at least one projection is plastically deformable.

In some embodiments, the projection is made of the same material as the cup.

In some embodiments, the projection is integral with the cup.

In some embodiments, each ridge of the plurality of ridges has substantially the same height.

In some embodiments, each ridge of the plurality of ridges has substantially the same width.

In some embodiments, a width of a ridge of the plurality of ridges is smaller than a height of that ridge.

In some embodiments, a ridge of the plurality of ridges has a width that is equal to or less than a thickness of the flange-like rim.

In some embodiments, a ridge of the plurality of ridges has a height that is equal to or less than a thickness of the flange-like rim.

In some embodiments, each ridge of the plurality of ridges has substantially the same cross sectional shape.

In some embodiments, a ridge of the plurality of ridges has a tapered, e.g. a substantially triangular, cross section.

In some embodiments, a radial distance between two neighbouring ridges is less than a maximum width of the ridges, preferably less than 50% of the maximum width, more preferably less than 25% of the maximum width.

In some embodiments, the plurality of ridges comprises two, three, four, five or six ridges.

In some embodiments, a ridge of the plurality of ridges has a height of less than 0.3 mm, preferably less than 0.21 mm, more preferably less than 0.15 mm.

In some embodiments, a ridge of the plurality of ridges has a maximum width of less than 0.3 mm, preferably less than 0.21 mm, more preferably less than 0.15 mm.

In some embodiments, the ridges are made from a plastic material.

In some embodiments, the ridges are plastically deformable.

In some embodiments, the capsule comprises a further ridge which is substantially concentrically enveloping the at least one projection, wherein a height of the further ridge is different from the height of the at least one projection.

In some embodiments, the height of the further ridge is larger than the height of the at least one projection.

In some embodiments, the further ridge comprises a conical section on an inner circumferential surface thereof.

In some embodiments, the lid is connected to cup at the second end of the circumferential wall, e.g. to the flange-like rim, and the inner space is at least partially filled with the extractable product.

In some embodiments, the capsule is hermetically closed.

In some embodiments, the lid and/or bottom is porous and/or comprises openings for allowing a liquid to enter and/or exit the inner space.

In some embodiments, the capsule is disposable.

In some embodiments, a system for preparing a predetermined quantity of beverage suitable for consumption using an extractable product, includes a capsule according to any one of the preceding clauses; and a beverage brewing device comprising a receptacle for interacting with the capsule, wherein, in use, the at least one projection abuts against at least a portion of the receptacle such that a sealing engagement between the capsule and the receptacle is formed.

In some embodiments, the receptacle is provided in a form of an enclosing member.

In some embodiments, the further ridge is arranged to abut against an outer circumferential surface of the enclosing member.

In some embodiments, the capsule is enclosed in the enclosing member such that the at least one projection abuts against at least the portion of the enclosing member, such that a sealing engagement between the capsule and the enclosing member is formed.

In some embodiments, a method of preparing a predetermined quantity of beverage suitable for consumption using an extractable product, includes the steps of—providing a capsule according to any one of the preceding clauses. providing a beverage brewing device comprising a receptacle for interacting with the capsule; positioning the capsule in the receptacle such that at least one of the projections contacts at least a portion of the receptacle for forming a sealing engagement between the capsule and the receptacle; providing a fluid, such as water, to the inner space of the capsule for preparing the beverage; and draining the beverage from the capsule.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A capsule for preparing a predetermined quantity of beverage suitable for consumption using an extractable product, by means of a beverage brewing device comprising a receptacle for receiving the capsule, comprising
    a cup comprising a circumferential wall, a bottom closing the circumferential wall at a first end, and
    a lid in use connected to the cup at a second end of the circumferential wall opposite the bottom,
    wherein the wall, bottom and lid, in use, enclose an inner space comprising the extractable product,
    wherein at least a portion of a surface of the capsule conceived to, in use, interact with the receptacle is provided with at least one projection for forming a sealing engagement with the receptacle; and
    wherein the at least one projection comprises a sponge capable of retaining fluid.

2. The capsule according to claim 1, wherein the cup further comprises a flange-like rim extending outwardly of the circumferential wall at the second end, wherein the at least one projection is provided on the flange-like rim.

3. The capsule according to claim 1, wherein the at least one projection is circumferential with respect to the capsule.

4. The capsule according to claim 1, wherein the at least one projection is provided on separate regions along a periphery of the capsule.

5. The capsule according to claim 1, wherein a height of the at least one projection is modulated.

6. The capsule according to claim 1, wherein the at least one projection is flexible.

7. The capsule according to claim 6, wherein the at least one projection is elastically deformable.

8. The capsule according to claim 1, wherein the at least one projection is plastically deformable.

9. The capsule according to claim 1, wherein the projection is made of the same material as the cup.

10. The capsule according claim 1, wherein the projection is integral with the cup.

11. The capsule according to claim 1, wherein the capsule comprises a further ridge which is substantially concentrically enveloping the at least one projection, wherein a height of the further ridge is different from the height of the at least one projection.

12. The capsule according to claim 11, wherein the height of the further ridge is larger than the height of the at least one projection.

13. The capsule according to claim 11, wherein the further ridge comprises a conical section on an inner circumferential surface thereof.

14. The capsule according to claim 1, wherein the lid is connected to the cup at the second end of the circumferential wall, and the inner space is at least partially filled with the extractable product.

15. The capsule according to claim 14, wherein the capsule is hermetically closed.

16. The capsule according to claim 14, wherein the lid and/or bottom is porous and/or comprises openings for allowing a liquid to enter and/or exit the inner space.

17. The capsule according to claim 1, wherein the capsule is disposable.

18. A system for preparing a predetermined quantity of beverage suitable for consumption using an extractable product, comprising:
    the capsule according to claim 1:
    and
    a beverage brewing device comprising a receptacle for interacting with the capsule,
    wherein, in use, the at least one projection abuts against at least a portion of the receptacle such that a sealing engagement between the capsule and the receptacle is formed.

19. The system according to claim 18, wherein the receptacle is provided in a form of an enclosing member.

20. The system according to claim 19, wherein the capsule comprises a further ridge which is substantially concentrically enveloping the at least one projection, wherein a height of the further ridge is different from the height of the at least one projection, wherein the further ridge is arranged to abut against an outer circumferential surface of the enclosing member.

21. The system according to claim 19, wherein the lid is connected to the cup at the second end of the circumferential wall, and the inner space is at least partially filled with the extractable product, wherein the capsule is enclosed in the enclosing member such that the at least one projection abuts against at least the portion of the enclosing member, such that a sealing engagement between the capsule and the enclosing member is formed.

22. A method of preparing a predetermined quantity of beverage suitable for consumption using an extractable product, comprising the steps of:
- providing a capsule according to claim 1;
- providing a beverage brewing device comprising a receptacle for interacting with the capsule;
- positioning the capsule in the receptacle such that at least one of the projections contacts at least a portion of the receptacle for forming a sealing engagement between the capsule and the receptacle;
- providing a fluid to the inner space of the capsule for preparing the beverage;
- draining the beverage from the capsule.

* * * * *